E. B. MOSELEY, DEC'D.
M. L. MOSELEY, ADMINISTRATRIX.
FILING APPLIANCE.
APPLICATION FILED MAY 26, 1915.
1,281,812.
Patented Oct. 15, 1918.
5 SHEETS—SHEET 5.
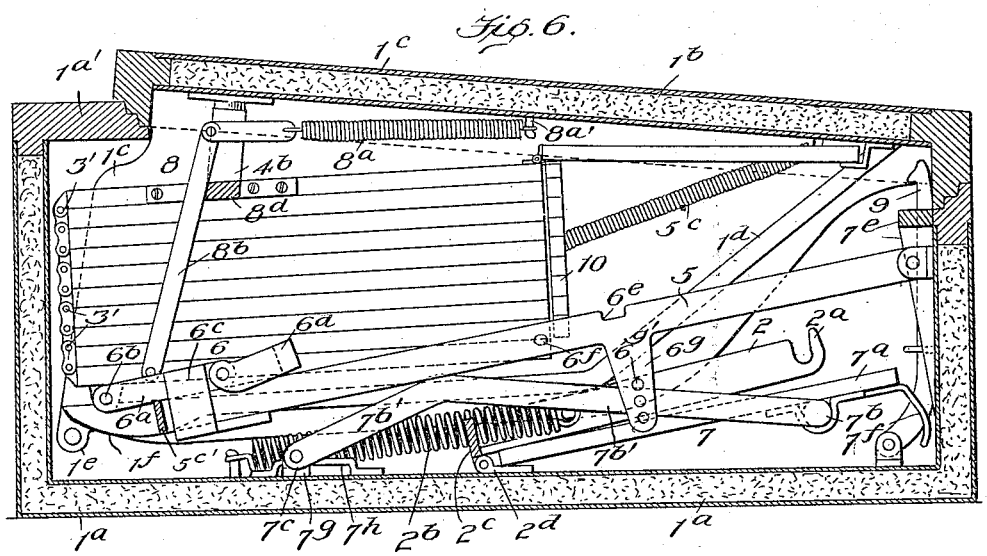
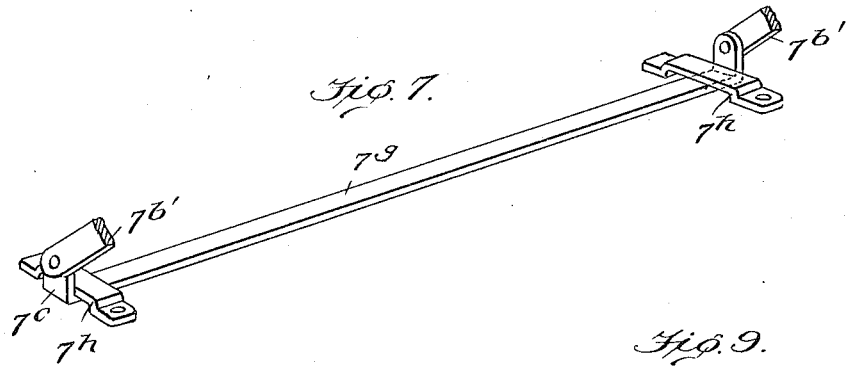
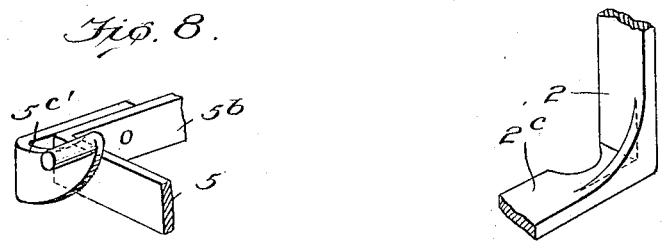
Inventor
Everson B. Moseley
By Edward R. Alexander
Attorney

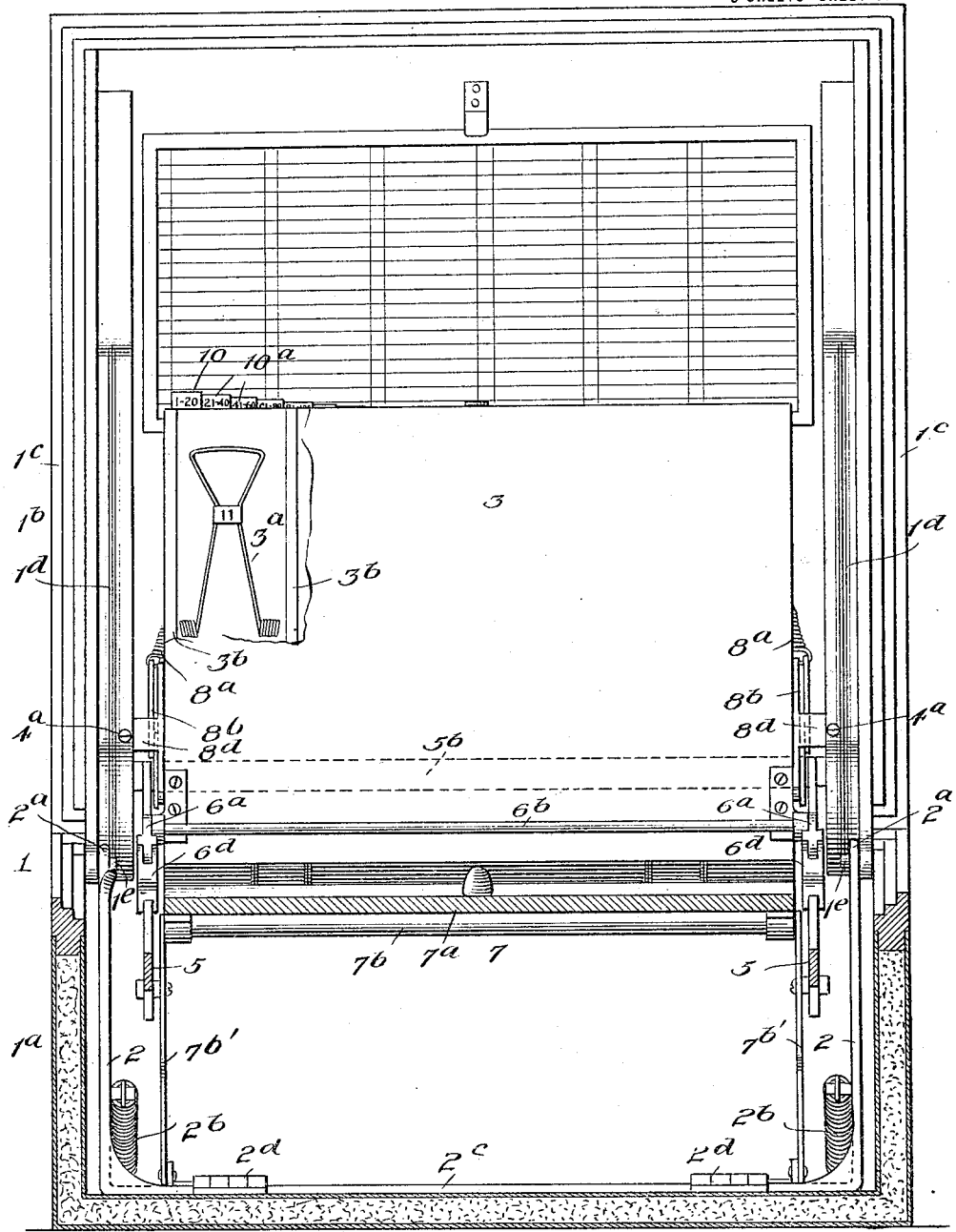

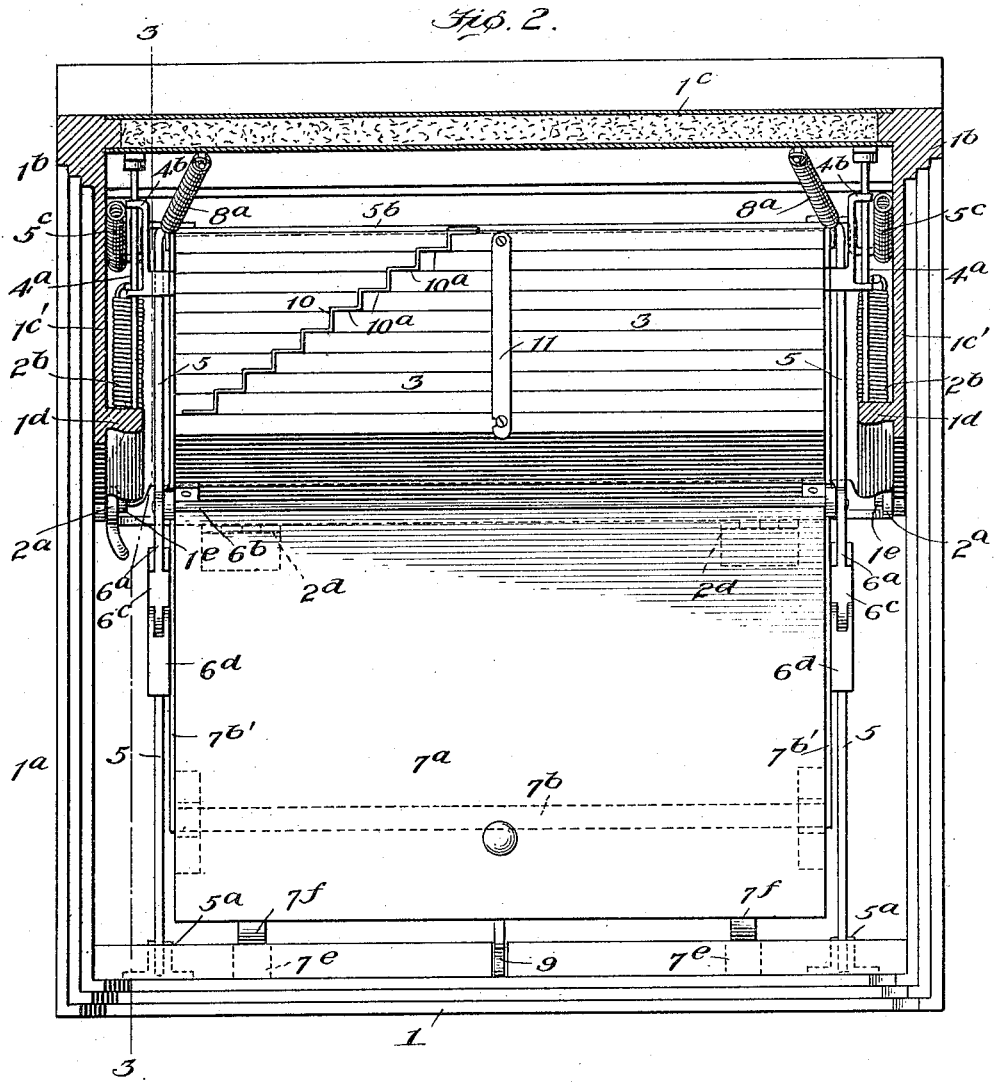

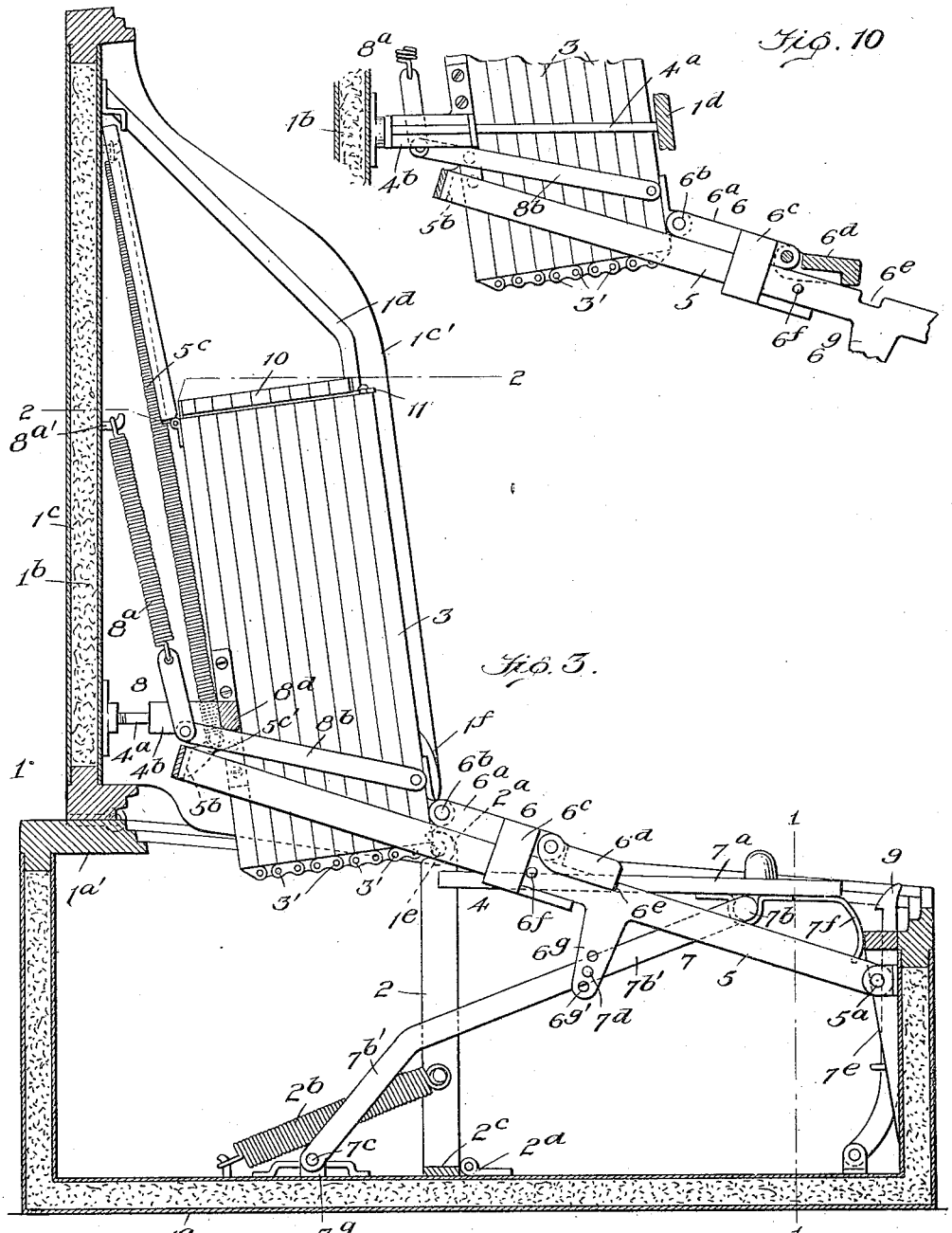

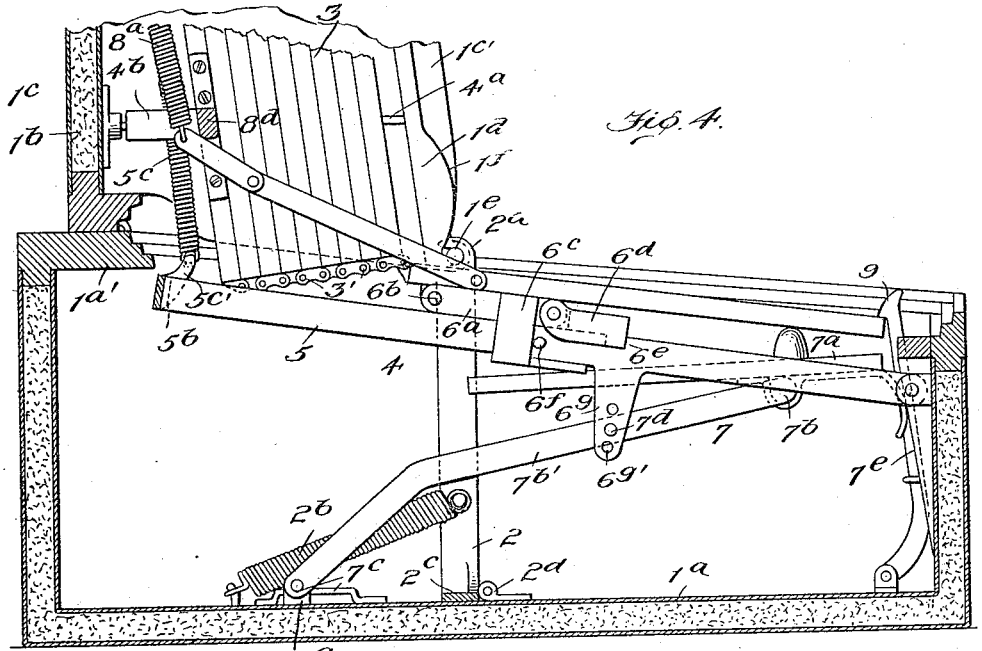
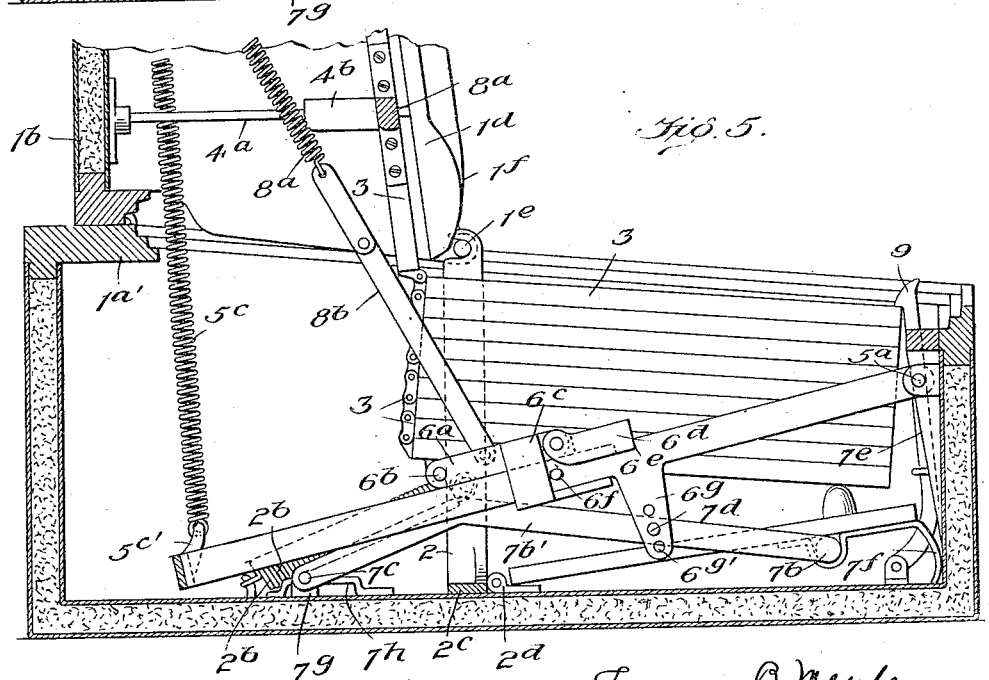

UNITED STATES PATENT OFFICE.

EMERSON B. MOSELEY, OF ALLIANCE, OHIO; METTA L. MOSELEY, ADMINISTRATRIX OF SAID EMERSON B. MOSELY, DECEASED, ASSIGNOR TO THE McCASKEY REGISTER COMPANY, (INCORPORATED IN 1914,) OF CANTON, OHIO, A CORPORATION OF OHIO.

FILING APPLIANCE.

1,281,812.        Specification of Letters Patent.      Patented Oct. 15, 1918.

Application filed May 26, 1915. Serial No. 30,672.

*To all whom it may concern:*

Be it known that I, EMERSON B. MOSELEY, a citizen of the United States, residing at Alliance, in the county of Stark and State of Ohio, have invented certain new and useful Improvements in and Relating to Filing Appliances, of which the following is a specification.

This invention relates to filing appliances, particularly of the pivoted frame type, wherein slips of paper can be filed in classified order, inspected and removed in a rapid and efficient manner and safely stored.

One object of the invention is to provide in appliances of this character an improved casing having a movable member, the casing being adapted to inclose the frames and other parts of the appliance and the movable member operating to permit access to the frames for inspection and manipulation.

Another object of the invention is to provide in appliances of this character improved means for supporting and controlling the easy and rapid operation of the frames.

Another object of the invention is to provide in appliances of this character improved means for so supporting and controlling the operation of the frames that the frame or frames which are exposed at any time are always positioned at a predetermined distance from the eyes of the operative.

With these and other objects in view, the invention consists of the parts and combination or combinations of parts hereinafter described and set forth in the appended claims.

For the purpose of illustration I have, in the accompanying drawings, shown and herein described one form of apparatus embodying my invention.

Referring to the drawings, Figure 1 is a view, partly in elevation and partly in section (which sectional part is taken on the line 1—1 of Fig. 3) of a filing appliance and casing therefor embodying my invention.

Fig. 2 is a section on the line 2—2 of Fig. 3.

Fig. 3 is a side elevation of the filing appliance, with the near side of the casing removed.

Fig. 4 is a fragmentary view similar to Fig. 3, but showing the position of the frames when the front one thereof is operated.

Fig. 5 is a view similar to Fig. 4, showing the position of the parts when all the frames, except the last one thereof, are operated.

Fig. 6 is a view of the filing appliance, showing the position of the leaves and other parts of the interior mechanism when the casing is closed.

Figs. 7, 8, and 9 are detail views.

Fig. 10 is a fragmentary view of the leaves and adjacent parts, the leaves being shown in the position they occupy when bodily moved rearwardly in the cabinet.

In the drawings, 1 indicates as an entirety a casing comprising a lower member $1^a$, which is preferably stationary, and an upper member $1^b$ pivoted on and swingable relative to the lower member $1^a$. The upper or movable member $1^b$ is adapted to fit upon the lower member $1^a$, as shown in Fig. 6 and when so positioned forms a substantially closed casing. From this position, the casing member $1^b$ is swingable to an upright position, as shown in Fig. 3.

The meeting edges between the casing members are preferably of the stepped or interlocking type to prevent easy access to the casing.

The casing members $1^a$, $1^b$, are of suitable size and shape to house the slip holding frames and other parts of the apparatus.

As shown in the drawings, the casing members $1^a$, $1^b$, are constructed of fire resisting structural elements and materials in any preferred manner, so as to make the casing 1 substantially fire proof. This construction permits the paper receiving and supporting frames to be inclosed within the casing and stored during closing hours of the business or office in which the appliance is used, without danger from fire, or at least any greater danger than would be incident to storage of the frames in a safe or vault. In this connection the casing 1 is adapted to be suitably locked and otherwise constructed to prevent opening by unauthorized persons.

The movable member $1^b$ is preferably hinged along its lower edge in any suitable manner to the rear wall of the member $1^a$, or a cross member $1^{a\prime}$ connected thereto. The movable member $1^b$ preferably comprises a back or top $1^c$ and side members $1^{c'}$, which are rigidly secured together in a well known manner. The side members $1^{c'}$ are secured to the top at a point slightly remote from its opposite edges so that when the movable member $1^b$ is closed, the side members $1^{c'}$ move to and occupy a position side by side with the side walls of the member $1^a$. $1^d$ indicates guides, one carried by each of the side members $1^{c'}$ for a purpose to be later described.

2 indicates a pair of swingable members having hook-shaped free ends $2^a$, each of which is adapted to be connected to a pin $1^e$ fixed to the outer lower edge of the adjacent side member $1^{c'}$. The members 2 are mounted on the casing member $1^a$ and serve to support the front ends of the side members $1^{c'}$, and through them to maintain the movable member $1^b$ in upright position, as shown in Fig. 3, and incapable of either forward or rearward movement. The hooks $2^a$ and pins $1^e$ serve as detachable connections between the members 2 and sides $1^{c'}$. $2^b$ indicates one or more springs interposed between and connected at their opposite ends to the member $1^a$ and members 2, and tending to swing the members 2 rearwardly into engagement with the pins $1^e$.

The guides $1^d$ serve to control and guide the supporting members 2, so that when the movable member $1^b$ is elevated the members 2 will automatically engage the pins $1^e$ just as the casing member $1^b$ reaches the upright position. Each guide $1^d$ is disposed in the vertical plane of the adjacent member 2 and extends down to a point close to the adjacent pin $1^e$. During the opening and closing of the casing, the free ends of the member 2 will ride on said guide, being maintained in engagement therewith by the springs $2^b$. Assuming that the casing 1 is open and it is desired to close it, it is first necessary to swing the members 2 forwardly slightly to disengage them from their pins $1^e$; thereupon the top movable member $1^b$ can be swung downwardly on top of the stationary casing member $1^a$. During this operation the members 2 will ride upwardly on the guides $1^d$ and be forced forwardly thereby in opposition to the tension of the springs $2^b$; when the movable member $1^b$ is opened or swung upwardly, the members 2 will ride on the guides in the opposite direction and be guided into engagement with the pins $1^e$, which operation will be effected as the movable member $1^b$ reaches the upright position. Each of the guides $1^d$ is preferably provided with a cam $1^f$ which serves to swing the adjacent member 2 slightly forward just prior to the engagement of the hook $2^a$ thereof with the pin $1^e$, so that as the member $1^b$ moves into the upright position, the members 2 will swing outwardly and then inwardly about their pivots to properly interlock with the pins $1^e$. As a result of this construction and operation, I am enabled to provide a simple, yet highly efficient, form of support between the front end of the side members $1^{c'}$ and the supporting members 2 and to provide for the automatic connection therebetween. The members 2 are preferably connected together by a transverse bar $2^c$ which has pivot connection $2^d$ with the bottom of the member $1^a$. The pivot connections $2^d$ between the bar $2^c$ and the casing member $1^a$ are preferably so arranged that the latter forms a stop to limit the rearward movement of the members 2 beyond the vertical plane thereof.

3 indicates a series of frames, each of which is adapted to removably receive and support slips of papers—such as sales slips—in classified order or otherwise. $3^a$ indicates the clips (only one being shown) preferably formed of resilient wire and secured to the inner faces of the front and rear frames and to the opposite faces of each of the remaining frames, whereby they serve to secure to the frames the slips of paper in a manner well known to those skilled in the art to which my invention relates. The frames 3 are pivoted to each other at $3'$ in any suitable manner along their lower edges. Each frame may be constructed in any preferred manner, and provided with longitudinally extending spacers $3^b$ which serve to form pockets or side walls for the slips filed behind each clip $3^a$ and spacing devices between the frames, whereby the latter can be bunched together face to face without danger of interference between the clips $3^a$ or slips on adjoining frames.

4 indicates as an entirety the devices for supporting the frames 3 and permitting them to swing singly or in groups (except the rearmost frame) from an upright position to a horizontal position, and vice versa, and to be inclosed within the casing 1 when the movable member $1^b$ thereof is folded downwardly or closed. Of these devices, $4^a$ indicates a pair of guides carried by the member $1^b$. Each of the guides $4^a$ preferably comprises a rod which may be connected at its front end to the adjacent side $1^{c'}$ and at its rear end to the top $1^c$. Each rod is preferably spaced from the adjacent side $1^{c'}$ so as to extend through openings formed in the laterally projecting arms of a bracket or U-shaped member $4^b$ to slidably support it. The brackets $4^b$ are rigidly secured to the opposite side edges of the rearmost frame 3 and serve to movably support the rear end of the series of frames on the member $1^b$. 5 indicates a pair of members pivotally supported at their front ends to two lugs $5^a$ preferably secured to the front wall of the casing member $1^a$. The members 5 support the front end of the series of frames 3, as will be hereinafter set forth.

The swingable members 5 may be connected together by a member 5ᵇ so that they will operate together. By preference, the members 5 and 5ᵇ are formed from a single bar which is bent into U shape, as shown in Fig. 2. The bar 5ᵇ at or near its connection with the members 5 is supported by one or more springs 5ᶜ which are connected at their opposite ends to the casing member 1ᵇ and the members 5 and normally tend to swing the members 5 upwardly to the position shown in Fig. 3, but permit movement of the members 5 downwardly when the frames 3 are operated, as will be later described. The lower end of each spring 5ᶜ is preferably connected to a bracket 5ᶜ′, which in turn is secured to the bar 5ᵇ, as shown in Fig. 8. 6 indicates devices which pivotally connect the front frame 3 of the series of frames to the members 5 and permit movement of the frames longitudinally of said members 5 when it is desired to position the frames for operation or to close the casing member 1ᵇ. Each of the devices 6 preferably comprises a support 6ᵃ which has pivotal connection at its rear end with a pivot pin 6ᵇ carried by the front frame 3. The support 6ᵃ slides upon the adjacent member 5, being preferably provided with a strap or loop 6ᶜ, which surrounds the adjacent member 5 and thus maintains the support 6ᵃ in sliding engagement therewith. 6ᵈ indicates a lock which is pivoted to the support 6ᵃ. The lock 6ᵈ is adapted to fit within a recess 6ᵉ formed in the adjacent member 5 and, through its engagement with the front and rear end walls of the recess 6ᵉ, to lock the support 6ᵃ against movement longitudinally of the member 5. When the supports 6ᵃ are secured to the members 5 in the manner just described, the frames 3 may be supported in an upright position within convenient reach of an operative who stands at the front of the casing 1 to operate them. Stops 6ᶠ are preferably provided on the members 5 to limit the forward movement of the supports 6ᵃ so as to facilitate movement of the frames 3 to their normal position for operation. When it is desired to close the movable member 1ᵇ, the locks 6ᵈ are first elevated; thereafter the supports 6ᵃ are slid rearwardly to the position illustrated in Fig. 10, the brackets 4ᵇ serving through their engagement with the back 1ᶜ to limit the rearward movement of the frames 3.

As will be understood from the drawings, the supports 6ᵃ and pivots 6ᵇ serve as the pivotal connection between the members 5 and the front end of the series of frames 3. Preferably the pivots 6ᵇ between the supports 6ᵃ and front frame 3 are arranged above the pivots 3′ between the front frame and the adjoining frame. As a result of this construction, the weight of the frames, acting through the front frame 3, the supports 6ᵃ and the pivot connections 6ᵇ therebetween, tends to normally maintain the front frame 3 in upright position and through it all of the remaining frames.

7 indicates devices which support the front ends of the frames 3 when they are operated to a horizontal position. The support 7 is arranged to yield or move downwardly accordingly as one or more of the frames are operated, so that that frame, which at any time is exposed in the horizontal position, will always be at substantially a predetermined position or distance from the eyes of the operative. Of these devices, 7ᵃ indicates a base or platform, on which the front frame rests when moved to the horizontal position. The base 7ᵃ is preferably mounted on a transverse shaft or rod 7ᵇ, which is supported at its opposite ends by a pair of arms 7ᵇ′. Each arm 7ᵇ′ is pivotally and slidably supported, at its rear end, upon the stationary casing member 1ᵃ, as shown at 7ᶜ, and is pivotally connected intermediate its ends at 7ᵈ to a depending bracket 6ᵍ preferably formed integral with the adjacent swingable member 5. The object of this pivot connection is to form an operative connection between each arm 7ᵇ′ and adjacent swingable member 5, whereby said arm will be operated downwardly and upwardly accordingly as the member 5 is swung on its pivot by the operation of the frames to and from the horizontal position. Due to the fact that the arms 5 swing in vertical planes about their pivots 5ᵃ, the arms 7ᵇ′ will be moved slightly forwardly and rearwardly during the operation of the arms 5; but this movement is compensated for by reason of the pivotal and slidable connection 7ᶜ between the arms 7ᵇ′ and the casing member 1ᵃ. 7ᵉ indicates one or more cams with which the front end of the base or platform 7ᵃ, or a shoe or shoes 7ᶠ carried thereby, engage during the vertical movement of the base 7ᵃ. The base or platform 7ᵃ is pivotally mounted on the shaft 7ᵇ relative to the arms 7ᵇ′ so as to permit movement of the frames 3 into or within the casing member 1ᵃ when the movable member 1ᵇ thereof is closed and the supporting and controlling devices 4 interfold therewithin, as shown in Fig. 6. The function of the cams 7ᵉ through their engagement with the shoes 7ᶠ is to swing the rear end of the platform 7ᵃ upwardly so that said platform will occupy a substantially horizontal position, adapted to serve as a writing desk when all of the frames are in the upright position, as shown in Fig. 3.

Since the base 7ᵃ is connected to and operated by the swinging members 5, it coöperates with the supporting devices 4 to support those frames 3 which are moved to the horizontal position, permitting their collocation or stacking one on another in horizontal position and movement vertically, with the exposed horizontal frame 3 always in the predetermined operative position.

The brackets $6^g$ may be provided with a series of openings $6^{g'}$ to permit adjustment of the pivot connections $7^d$ between the brackets and the arms $7^{b'}$. The pivotal and slidable connection $7^c$ between the arms $7^{b'}$ and casing member $1^a$ preferably comprises a bar $7^g$ having up-turned ends, to which the arms $7^{b'}$ are pivoted, and straps $7^h$ which secure the bar $7^g$ in sliding engagement with the bottom of the casing member $1^a$. This construction serves to insure alinement and uniform movement of the arms $7^{b'}$ at all times.

8 indicates, as an entirety, a set or sets of devices which yieldingly tend to maintain the frames in either the upright position or the horizontal position, according to which position they are moved. I preferably provide two sets of devices 8, disposed at and arranged to act simultaneously upon the opposite sides of the frames. Referring to one of these sets of yielding devices, $8^a$ indicates a spring which is connected at one end to the back $1^c$ of the movable member $1^b$, as shown at $8^{a'}$. $8^b$ indicates a connector, which may comprise articulate elements, connected to the outer end of the spring $8^a$ and, by preference, to the front frame 3. The connection between the front end of the connector $8^b$ and the front frame 3 is a pivotal one. It is arranged at a point slightly remote from the lower end of the said frame. When the frames 3 are upright, the devices 8 act on the front frame 3 and through it, all of the remaining frames, to maintain them in such position. If the front frame 3 or it and one or more succeeding frames, is or are operated to the horizontal position, the connector $8^b$ will be pulled downwardly with the front frame and in opposition to the tension of the spring $8^a$. During this operation, except as will be presently described, the spring $8^a$ and connector $8^b$ will swing about the connection between the spring $8^a$ and casing member $1^b$ as an axis, such connection advantageously permitting this operation. However, if a certain number of the frames 3, six or more frames in the present illustrated embodiment of my invention, be operated to the horizontal position, the connector $8^b$ will be carried to a point beyond the axis of the pivot $3'$ connecting the then exposed frames together, as shown in Fig. 5; in such event, the connector $8^b$ will be disposed on the far side of its "dead-center" position and therefore the spring $8^a$ will act on the front frame 3 and through it, all of the operated frames to yieldingly maintain them in the horizontal position.

$8^d$ indicates devices fixed to the opposite sides of the rear frame 3 and adapted to be engaged by the connectors $8^b$ when all or substantially all of the frames are returned to the upright position. The devices $8^d$ project laterally from the rear frame 3 and form walls around which the connectors $8^b$ extend, as shown in Fig. 4, so that the force of the springs acting through them upon the front frame 3 will be in a direction most effective to hold the front frame in the upright position. The purpose of this construction and operation is to prevent the connectors $8^b$ from swinging upwardly beyond a predetermined point or to a position in which the springs will become incapable of holding the frames 3 upright. Since, as already set forth, the connectors $8^b$ are formed of articulate elements, they may be arrested in their upward movement by the devices $8^d$ and disposed therearound, so that they, under the influence of the springs $8^a$, will pull in a substantially horizontal direction rearwardly on the front frame 3. The elements of each connector $8^b$ are arranged to ride on the adjacent device $8^d$ until they become disengaged therefrom. Each device $8^d$ preferably consists of the arm or bracket which connects the adjacent U-shaped member $4^b$ to the rear frame 3.

9 indicates a catch which is adapted to engage with and hold the exposed horizontal frame in operated position. The catch 9 is preferably arranged in front of the frames and substantially midway between the opposite sides of the casing member $1^a$. It may be loosely pivoted on the bottom of the casing member $1^a$ to swing forwardly and rearwardly. The nose of the catch 9 is adapted to overlie the exposed frame, and when so positioned, the upward pull of the springs $5^c$ acting through the members 5 on the frames 3 will serve to prevent the disengagement therefrom. The catch 9 is moved into and out of position by the operative. The catch always engages the exposed frame, when one or more frames are moved to the horizontal position, due to the fact that all the prior operated frames will sink therebelow.

From the foregoing description, it will be understood that the series of frames 3 is supported at its front end by the swingable members 5 and at its rear end by the guide members $4^a$, $4^b$, and that these members 5, $4^a$, $4^b$, coöperate to support and permit operation of the frames singly or in groups from one position to the other and back again. It will also be understood that as the guide devices $4^a$ on the casing member $1^b$ are stationary, and the members $5^a$ are swingable, these parts permit those frames, which have been operated at any time to the horizontal position, to move downwardly and upwardly, accordingly as one or more additional frames are operated about their pivots, and at the same time permit those frames remaining upright to move forwardly and rearwardly according to the number of frames operated to and from the horizontal position; as a result of this construction, the frame or frames which are exposed for filing and inspection purposes are always arranged at a predetermined position or at the same distance from the eyes of the operative. Such construction, as will be readily seen, lends itself to easy and rapid operation with the expenditure of minimum labor and time. The rear frame 3 being slidably mounted upon the guide devices 4ª, it is free to move rearwardly and forwardly due to the operation of the remaining frames and carry with it those frames remaining upright.

By preference, the supporting members 5 and devices 7 are arranged to support the frame or frames 3, which at any time may be moved to a horizontal position in an inclined position and at an obtuse angle to those frames remaining in the upright position, and to guide them downwardly and rearwardly in a substantially inclined direction.

It will be understood that the springs 5ᶜ act through the members 5 and tend to swing the frames 3 upwardly, and this tendency is increased as additional frames are operated to the horizontal position. However, owing to the position of the pivots 5ª, the pivots 6ᵇ, during operation of the frames 3, traverse a path which extends downwardly and slightly rearwardly, the effect of which is to decrease the leverage between the pivots 6ᵇ and the pivots 3' connecting the two frames, which are exposed at any time, together, as additional frames are operated, so that the increased tension of the springs 5ᶜ will be counteracted by the decrease of the leverage between the pivots 6ᵇ and the pivots between the two exposed frames. From this it follows that the force acting upwardly on the frames will be substantially uniform at all times.

10 indicates a device which forms both a signal for the eyes and a guide for the hands of the operative, whereby the operation of the frames is facilitated. This device preferably comprises a bar which is bent or otherwise formed into zigzag or stepped shape. This device 10 is carried by the upper end of the rear frame 3 and extends over the frames and in a plane above their upper edges, when they are arranged in normal position. The device 10 preferably extends in an inclined direction across the frames and is so shaped that its alternate legs or sections 10ª are disposed parallel with and in the plane of the front edges of the frames, as will be clearly understood from Fig. 2. Each of these legs or sections has attached to, or painted on, it a character or characters indicating which accounts or classified pockets are carried by the adjacent frame, so that the operative can quickly see and be guided to the frames carrying the slip holding clip 3ª which he at any time wants to get to. As the walls of the device 10 form abutments or guides for the operative's hands and the signal characters on the wall form a signal to his eyes, the hands of the operative are guided automatically to the particular frames to which access is desired.

11 indicates a bail or equivalent device which is connected to the rear frame 3. Its front end is provided with a hook which is adapted to engage a pin or screw on the front frame 3 and thus lock all the frames together. This bail may be operated prior to the closing of the casing member 1ᵇ to assist in maintaining the frames in assembled position and to prevent strains on any of the supporting and controlling members 4.

As will be seen from the drawings, the casing 1 is of substantially rectangular shape, whereby it may be conveniently positioned on a counter or other support, and the parts which support and control the operation of the frames are arranged to coöperate with each other, the casing members and the frames to effect their functions without extending outside the casing; furthermore, these parts coöperate to support the frames operatively in a casing of minimum size.

To those skilled in the art of making appliances of the class described, many alterations in construction and widely differing embodiments and applications of my inventon will suggest themselves, without departing from the spirit and scope thereof. My disclosures and the descriptions herein are purely illustrative and are not intended to be in any sense limiting.

What I claim is:—

1. In a filing appliance, the combination with a casing and a set of frames having pivoting connections between them, of a swingable support on which said series of frames are pivotally mounted, and fixed guides between the rear frame and said casing serving to guide the rear frame forwardly and rearwardly.

2. In a filing appliance, the combination with a casing and a set of frames, having pivoting connections between them, of a swingable support on which said series of frames are pivotally mounted, guides between the rear frame and said casing serving to guide the rear frame during operation of one or more of the remaining frames, and means arranged rearward of said set of frames tending to swing the said swingable support upwardly.

3. In a filing appliance, the combination with a casing and a set of frames having pivoting connections between them, of a swingable support on which said series of frames are pivotally mounted, the pivot for said series of frames being arranged above the plane of the pivots between the frames when the latter are in vertical position.

4. In a filing appliance, the combination of two members one of which folds relative to the other to form a closed casing, a series of frames having pivoting connections between them, a device, to which one of the end frames of the series is connected, slidably mounted on one of said members, and a device, to which the opposite end frame is pivoted, swingably mounted on the other member, and means for pivotally connecting the casing members together.

5. In a filing appliance, the combination of a lower box-like member and an upper member pivotally connected thereto and coöperable therewith to form a closed casing, a series of frames having pivot connections between them permitting the frames to be operated relative to each other, means for slidably connecting the rear end frame of the series to the upper casing member, a device swingably mounted at the front end of said lower member and arranged to swing upwardly and downwardly, and pivot connections between the front end frame and said device.

6. In a filing appliance, the combination of two members one of which folds relative to the other to form a closed casing, a series of frames having pivoting connections between them, a device, to which one of the end frames of the series is connected, slidably mounted on one of said members, and a device, to which the opposite end frame is pivotally connected, swingably mounted on the other member, the pivotal connection between the last mentioned device and the adjacent end frame being slidable relative to said last mentioned device.

7. A filing case including base and cover sections with hinge connections for swinging the cover section upon the base section, a plurality of hinged holders mounted in the case and having engagement with the cover section, a lifting lever having one end pivoted to one end of the base section, spring means for elevating the opposite end of the lifting lever, and means connected with the hinged end of the lower holder having sliding and bearing engagement with the lifting lever.

8. In a filing appliance, the combination of two members one of which folds relative to the other to form a closed casing, a series of frames having pivoting connections between them, a device, to which one of the end frames of the series is connected, slidably mounted on one of said members, a device, to which the opposite end frame is pivotally connected, swingably mounted on the other member, the pivotal connection between the last mentioned device and the adjacent end frame being slidable relative to said last mentioned device, and means for maintaining said pivotal connection in a fixed position.

9. In a filing appliance, the combination of a series of frames having pivots between them, a pair of casing members pivotally connected together, whereby one member can be operated to inclose the frames, means for holding the movable casing member open, and means for supporting upon and connecting each end frame of the series to the adjacent casing member, and permitting the closing of the movable casing member without disconnection of the end frames from said casing members.

10. In a filing appliance, the combination of a series of frames having pivots between them, a pair of casing members pivotally connected together, whereby one member can be operated to inclose the frames, means for holding the movable casing member open, and devices for supporting the opposite end frames of the series on said members and permitting the closing of the casing without disconnection of the frames therefrom, one of said devices including a connection which permits relative movement between the series of frames and the adjacent device when the movable casing member is to be closed.

11. In a filing appliance, the combination of a series of frames having pivots between them, a pair of casing members pivotally connected together, whereby one member can be operated to inclose the frames, means for holding the movable casing member open, devices for supporting upon and connecting each end frame of the series to the adjacent casing member and permitting the closing of the movable casing member without disconnection of said end frames from said devices, one of said devices being movable, and means tending to move said movable device in one direction.

12. In a filing appliance, the combination of a series of frames having pivots between them, a pair of casing members pivotally connected together, whereby one member can be operated to inclose the frames, means for holding the movable casing member open, devices for supporting the opposite end frames of the series on said members and permitting the closing of the casing without disconnection of the frames therefrom, one of said devices being movable, means tending to move said movable device in one direction, and means separate from said devices tending to maintain the frames in a substantially upright position.

13. In a filing appliance, the combination with a support and a series of frames having connections between them permitting the frames to be moved to and from the horizontal position, of connections between the rear frame of the series and said support for slidably supporting the rear frame as one or more of the remaining frames are operated, a device to which the front end frame of the series is pivoted, said device being swingably mounted on said support to move downwardly by the operation of one or more frames to the horizontal position and the stacking thereof one on another, whereby the uppermost or exposed frame is always positioned at a predetermined distance from the eyes of the operative, and means tending to move said device upwardly.

14. In a filing appliance, the combination of a support, a series of frames having pivotal connections between them, a member swingably mounted on said support, and supporting devices between the opposite end frames of the series of frames and said support and member to which said end frames are slidably connected, one of said devices including a pivot for the adjacent end frame, and means acting upon said swingable member and tending to maintain the frames in upright position.

15. In a filing appliance, the combination of a support, a series of frames having pivotal connections between them, a member swingably mounted on said support, and supporting devices between the opposite end frames of the series of frames and said support and member to which said end frames are slidably connected, one of said devices including a pivot for the adjacent end frame, means acting on said member tending to maintain the frames upright, and auxiliary means tending to maintain the frames in upright position.

16. In a filing appliance, the combination of a support, a series of frames having pivotal connections between them, a member swingably mounted on said support, supporting devices between the opposite end frames of the series of frames and said support and member to which said end frames are slidably connected, one of said devices including a pivot for the adjacent end frame, means acting on said member tending to maintain the frames upright, and separate means acting directly on the front end frame and tending to maintain the frames in upright position.

17. In a filing appliance, the combination of a support, a series of frames having pivot connections between them whereby they may be operated singly or in groups, means for slidably supporting one end frame of said series of frames upon said support to permit said end frame to move during operation of one or more of the remaining frames, and yielding devices operatively connected with said frames and tending to maintain them in an upright position or the operated frames in a horizontal position after a certain number of them have been operated.

18. In a filing appliance, the combination of a support, a series of frames having pivot connections between them whereby they may be operated singly or in groups, means for slidably supporting one end frame of said series of frames upon said support to permit said end frame to move during operation of one or more of the remaining frames, means for movably supporting the opposite end frame, and yielding devices tending to maintain the frames in an upright position or the operated frames in a horizontal position after a certain number of them have been operated.

19. In a filing appliance, the combination of a support, a series of frames having pivot connections between them whereby they may be operated singly or in groups, means for slidably supporting one end frame of said series of frames upon said support to permit said end frame to move during operation of one or more of the remaining frames, means for movably supporting the opposite end frame, and yielding devices connected to the front frame and tending to maintain the frames in an upright position or the operated frames in a horizontal position after a certain number of them have been operated.

20. In a filing appliance, the combination of a support, a series of frames having pivot connections between them, means for supporting said frames upon said support and permitting the operated frames to move downwardly, yielding devices pivotally connected to said support and the front frame and tending to maintain the frames in an upright position, or in a horizontal position after a certain number of them have been operated, and means engaging with said devices to position them for pull on the front frame in a rearward direction.

21. In a filing appliance, the combination of a support, a series of frames having pivot connections between them, means for supporting said frames upon said support and permitting the operated frames to move downwardly, yielding devices pivotally connected to said support and the front frame and tending to maintain the frames in an upright position or in a horizontal position after a certain number of them have been operated, and means carried by the rear frame arranged in the path of movement of said devices and engaging therewith to position them for pull on the front frame in a rearward direction.

22. In a filing appliance, the combination of a support, a series of frames having pivot connections between them, means, to which the front frame is pivoted, for movably supporting the front frame and permitting it to rise and fall, and a rising and falling device for supporting the free ends of the frames during the operation thereof.

23. In a filing appliance, the combination of a support, a series of frames having pivot connections between them, means for slidably supporting the rear frame, means for movably supporting the pivot for the front frame and permitting it to rise and fall, a rising and falling device for supporting the free ends of the frames during the operation thereof, means tending to elevate said device, and a support for said device having a slidable and pivotal connection with said first mentioned support.

24. In a filing appliance, the combination of a support, a series of frames having pivot connections between them, means for slidably supporting the rear frame, means for movably supporting the pivot for the front frame and permitting it to rise and fall, a rising and falling device for supporting the free ends of the frames during the operation thereof, a support for said device having a slidable and pivotal connection with said first mentioned support, and connections between the support for said rising and falling device and the supporting means for the front frame.

25. In a filing appliance, the combination of a support, a series of frames having pivot connections between them, means for slidably supporting the rear frame, means for movably supporting the pivot for the front frame and permitting it to rise and fall, a rising and falling device for supporting the free ends of the frames during the operation thereof, means for elevating said rising and falling device, and means for moving said rising and falling device into a horizontal position when it is elevated.

26. In a filing appliance, the combination of a support, a series of frames having pivot connections between them, means for slidably supporting the rear frame, means for movably supporting the pivot for the front frame and permitting it to rise and fall, a rising and falling device for supporting the free ends of the frames during the operation thereof, means for elevating said rising and falling device, and means for moving said rising and falling device into a horizontal position when it is elevated, said means including a cam between the device and the support.

27. In a filing appliance, the combination of a support, a series of frames having pivot connections between them whereby they may be operated singly or in groups, separate means for movably supporting the opposite end frames of the series of frames, the supporting means for the front frame including a pivot therefor, devices acting on the supporting means for the front frames tending to move the pivot for the latter upwardly, and means detachably engaging the uppermost horizontal frame when one or more of the frames are operated to the horizontal position for maintaining it and the frames below it in the horizontal position.

28. In a filing appliance, the combination of a casing comprising two members one of which is swingably mounted upon the other, a series of frames for receiving and holding papers arranged within the casing and pivotally mounted to swing relatively to each other from an upright position to a horizontal position and vice versa, and supporting and connecting devices between each end frame of said series of frames and the adjacent casing member, said devices permitting the operation of said frames relative thereto and the opening and closing of the movable casing member.

29. In a filing appliance, the combination of a casing comprising two members one of which is swingably mounted upon the other, a series of frames for receiving and holding papers arranged within the casing and pivotally mounted to swing relatively to each other from an upright position to a horizontal position and vice versa, and a movable device between each end frame of said series of frames and the adjacent casing member and arranged to support said end frame upon and connect it thereto, said devices permitting the operation of said frames and the opening and closing of the movable casing member.

30. In a filing appliance, the combination of a casing comprising two members one of which is swingably mounted upon the other, a series of frames for receiving and holding papers arranged within the casing and pivotally mounted to swing relatively to each other from an upright position to a horizontal position and vice versa, supporting and connecting devices between each end frame of said series of frames and the adjacent casing member, said devices permitting the operation of said frames and the opening and closing of the movable casing member, and means coöperating with said devices for supporting the operated frames in horizontal position.

31. In a filing appliance, the combination of a casing comprising two members one of which is swingably mounted upon the other, a series of frames for receiving and holding papers arranged within the casing and pivotally mounted to swing relatively to each other from an upright position to a horizontal position and vice versa, supporting and connecting devices between each end frame of said series of frames and the adjacent casing member, said devices permitting the operation of said frames and the opening and closing of the movable casing member, means for supporting the movable member in open position, and means coöperating with said devices for supporting the operated frames in horizontal position.

32. In a filing appliance, the combination of a pair of casing members one of which is swingably mounted upon the other, a series of frames for receiving and holding papers having pivots between them whereby they may swing relatively to each other from an upright position to a horizontal position and vice versa, supporting and connecting devices between each end frame of said series of frames and the adjacent casing member, said devices permitting operation of said frames and the opening and closing of the movable casing member, and means coöperating with said devices for supporting the operated frames in horizontal position.

33. In a filing appliance, the combination with a support and a series of frames having pivot connections between them permitting the frames to swing to and from a horizontal position, of connections between one end frame of the series and said support for slidably connecting the frames thereto, members swingably mounted upon said support to move upwardly and downwardly, and pivot connections between the opposite end frame of the series and said members, said members permitting the frames in the horizontal position to move downwardly and upwardly as any of the remaining frames are operated.

34. In a filing appliance, the combination with a support and a series of frames having pivot connections between them permitting the frames to swing to and from a horizontal position, of connections between one end frame of the series and said support for slidably connecting the frames thereto, members swingably mounted upon said support to move upwardly and downwardly, and pivot connections between the opposite end frame of the series and said members, said members permitting the frames in the horizontal position to move downwardly and upwardly as any of the remaining frames are operated, the connections between the said members and the adjacent end frame being detachable and permitting relative movement of said series of frames relative to said members.

35. In a filing appliance, the combination with a support and a series of frames having pivot connections between them permitting the frames to swing to and from a horizontal position, of connections between one end frame of the series and said support for slidably connecting the frames thereto, members swingably mounted upon said support to move upwardly and downwardly, pivot connections between the opposite end frame of the series and said members, said members permitting the frames in the horizontal position to move downwardly and upwardly as any of the remaining frames are operated, the connections between the said members and the adjacent end frame being detachable and permitting relative movement of said series of frames relative to said members, and means for limiting the movement of the series of frames on said members in one direction.

36. In a filing appliance, the combination of a support, a series of frames pivotally connected together to swing relatively to each other, a rear end frame of the series having sliding engagement with said support, a swingable member, to which the front end frame of the series of frames is pivotally connected, for movably supporting it, the said swingable member being pivoted to said support in front of said series of frames and at a point in substantially the same horizontal plane as the pivot connection of the front end frame therewith, and means tending to swing said swingable member upwardly.

37. In a filing appliance, the combination of a support, a series of frames pivotally connected together to swing relative to each other, means for slidably connecting the rear frame of the series to said support, a swingable member pivoted to said support in front of said series of frames, and means for pivotally connecting the front frame of the series to said swingable member.

38. In a filing appliance, the combination of a support, a series of frames pivotally connected together to swing relative to each other, means for slidably connecting the rear frame of the series to said support, a swingable member pivoted to said support at a point in substantially the same horizontal plane as the pivot for the front frame, in front of said series of frames, and means for pivotally connecting the front frame of the series to said swingable member.

39. The combination of a support, a series of frames pivotally mounted to swing relative to each other, means for slidably connecting the rear frame of the series to said support, a pair of swingable members pivotally mounted on said support, and means for slidably connecting the front frame of the series of frames to said members, whereby said series of frames can be bodily moved forwardly and rearwardly on said members.

40. The combination of a support, a series of frames pivotally mounted to swing relative to each other, means for slidably connecting the rear frame of the series to said support, a pair of swingable members pivotally mounted on said support, means for slidably connecting the front frame of the series of frames to said members, whereby said series of frames can be bodily moved forwardly and rearwardly on said members, and means for detachably connecting the slidable means to said members at a predetermined position.

41. The combination of a support, a series of frames mounted to swing relative to each other, means for slidably connecting the rear frame of the series to said support, a swingable member pivoted to said support in front of said series of frames, means for pivotally connecting the front frame of the series to said swingable member, and means, under the control of said swingable member, for supporting the free ends of the frames when the latter are operated to a horizontal position.

42. The combination of a support, a series of frames pivotally mounted to swing relative to each other, means for slidably connecting the rear frame of the series to said support, a swingable member pivoted to said support in front of said series of frames, means for pivotally connecting the front frame of the series to said swingable member, and means pivotally connected to said support and swingable member and controlled by the latter for supporting the free ends of the frames when the latter are operated to a horizontal position.

43. In a filing appliance, the combination of a support, a series of frames pivotally mounted to swing relative to each other from an upright to a horizontal position and vice versa, means for supporting the rear frame of the series upon said support, movable means for supporting the front frame of the series, yielding means acting on the front frame in a direction substantially rearward when the frames are in upright position, but arranged to act substantially vertically after a certain number of frames have been operated to the horizontal position.

44. In a filing appliance, the combination of a support, a series of frames having pivotal connections between them, means for supporting the rear end frame of said series of frames upon said support and permitting the operated frames to move downwardly, yielding devices pivotally connected to said support and the front end frame of said series of frames arranged to be placed under tension when one or more of the frames are operated, and means arranged in the path of movement of said devices and engaging therewith to position them for pull on the front frame in a rearward direction when the frames are returned to upright position.

45. In a filing appliance, the combination of a support, a series of frames having pivotal connections between them, means for supporting the rear end frame of said series of frames upon said support and permitting the operated frames to move downwardly, yielding devices pivotally connected to said support and the front end frame of said series of frames arranged to be placed under tension when one or more of the frames are operated, and means carried by the rear frame arranged in the path of movement of said devices and engaging therewith to position them for pull on the front frame in a rearward direction when the frames are returned to upright position.

46. In a filing appliance, the combination of a casing comprising two members, one of which is swingably mounted on the other, a series of frames arranged to swing relative to each other, means for slidably supporting one end frame of the series on the swingable casing member, a support pivotally mounted on the other casing member, means for pivotally connecting the opposite end frame of the series to said pivoted support, said pivoted support coöperating with the slidable supporting means to support the series of frames in operative position and in inoperative position when the swingable casing member is closed, the supporting means for the opposite end frames permitting intermediate frames to swing relative to each other and the casing members.

In testimony whereof I affix my signature, in the presence of a witness.

EMERSON B. MOSELEY.

Witness:
    CHAS. E. RICE.

It is hereby certified that in Letters Patent No. 1,281,812, granted October 15, 1918, upon the application of Emerson B. Moseley, of Alliance, Ohio, for an improvement in "Filing Appliances," errors appear in the printed specification requiring correction as follows: Page 5, line 75, and page 8, line 64, claim 27, for the word "frames" read *frame;* page 7, line 126, claim 22, after the word "means" insert the words *for slidably supporting the rear frame;* and that the said Letters Patent should be read with these corrections therein that the same may conform to the record of the case in the Patent Office.

Signed and sealed this 26th day of November, A. D., 1918.

[SEAL.]

R. F. WHITEHEAD,

*Acting Commissioner of Patents.*

Cl. 45—2.